United States Patent [19]

Lipschutz

[11] Patent Number: 4,574,368
[45] Date of Patent: Mar. 4, 1986

[54] DISTANCE MEASURING SYSTEM USING ULTRASONIC RANGING

[75] Inventor: James N. Lipschutz, Gulph Mills, Pa.

[73] Assignee: Record Industrial Company, King of Prussia, Pa.

[21] Appl. No.: 469,090

[22] Filed: Feb. 23, 1983

[51] Int. Cl.[4] .................... G01S 15/10; G01S 7/56
[52] U.S. Cl. ........................................ 367/108; 367/910
[58] Field of Search .................... 367/106, 108, 910

[56] References Cited

U.S. PATENT DOCUMENTS

| | | | |
|---|---|---|---|
| 3,174,128 | 3/1965 | Dow et al. | 367/106 |
| 3,522,764 | 8/1970 | Biber | 95/44 |
| 3,735,334 | 5/1973 | Ahrens et al. | 367/106 |
| 4,206,511 | 6/1980 | Ries et al. | 367/96 |
| 4,281,404 | 7/1981 | Morrow, Jr. et al. | 367/108 |

FOREIGN PATENT DOCUMENTS 2755556 6/1979 Fed. Rep. of Germany ...... 367/108

Primary Examiner—Richard A. Farley
Attorney, Agent, or Firm—Ratner & Prestia

[57] ABSTRACT

A system for measuring the distance between two objects, for determining the center between two objects and for triangulating the height of a tall object. In measuring the distance between two objects, an initial count is started when a first ultrasonic pulse is transmitted. The initial count is stopped when that pulse is received. The second pulse is transmitted only after a delay interval where the delay interval begins at the start of the initial count and is substantially equal to the maximum range time of a transducer. The restarted count is stopped when the second pulse is received, and the resultant count is displayed as a number related to the total distance between the objects.

9 Claims, 4 Drawing Figures

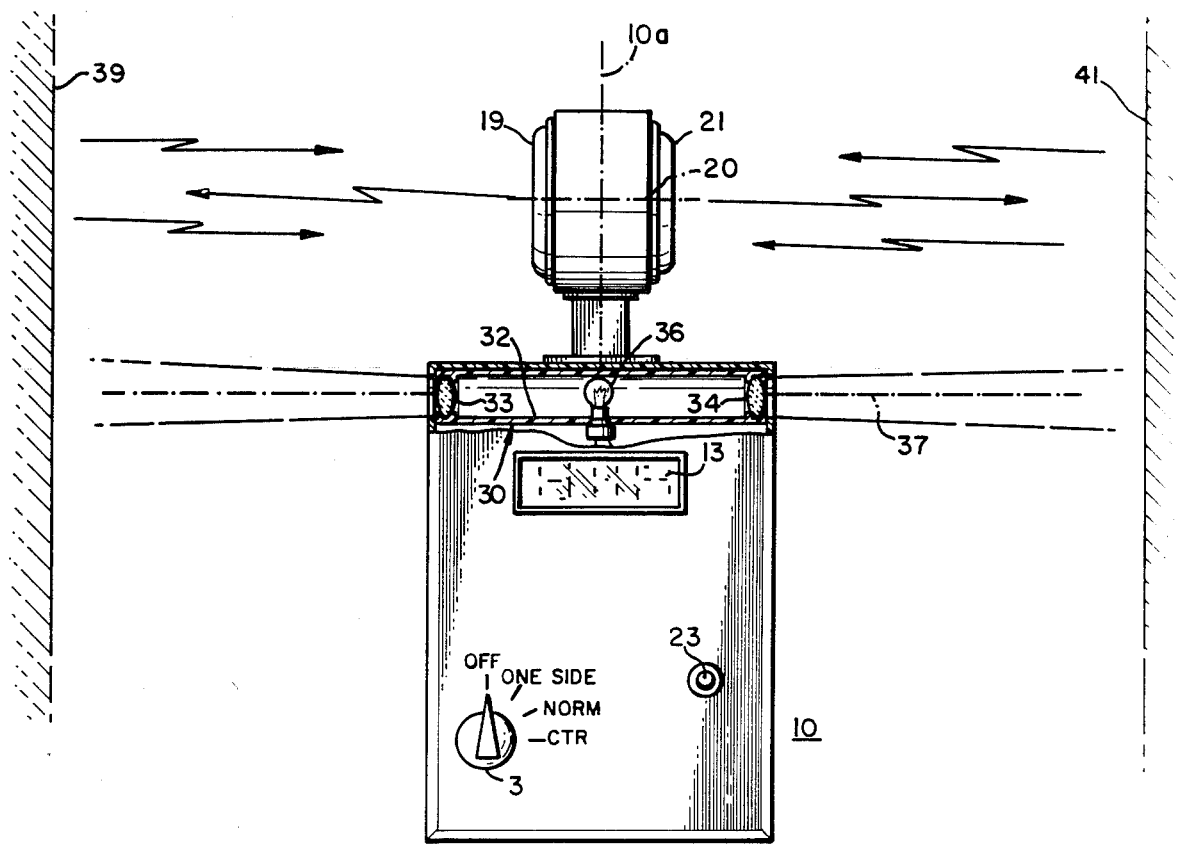
FIG. 1
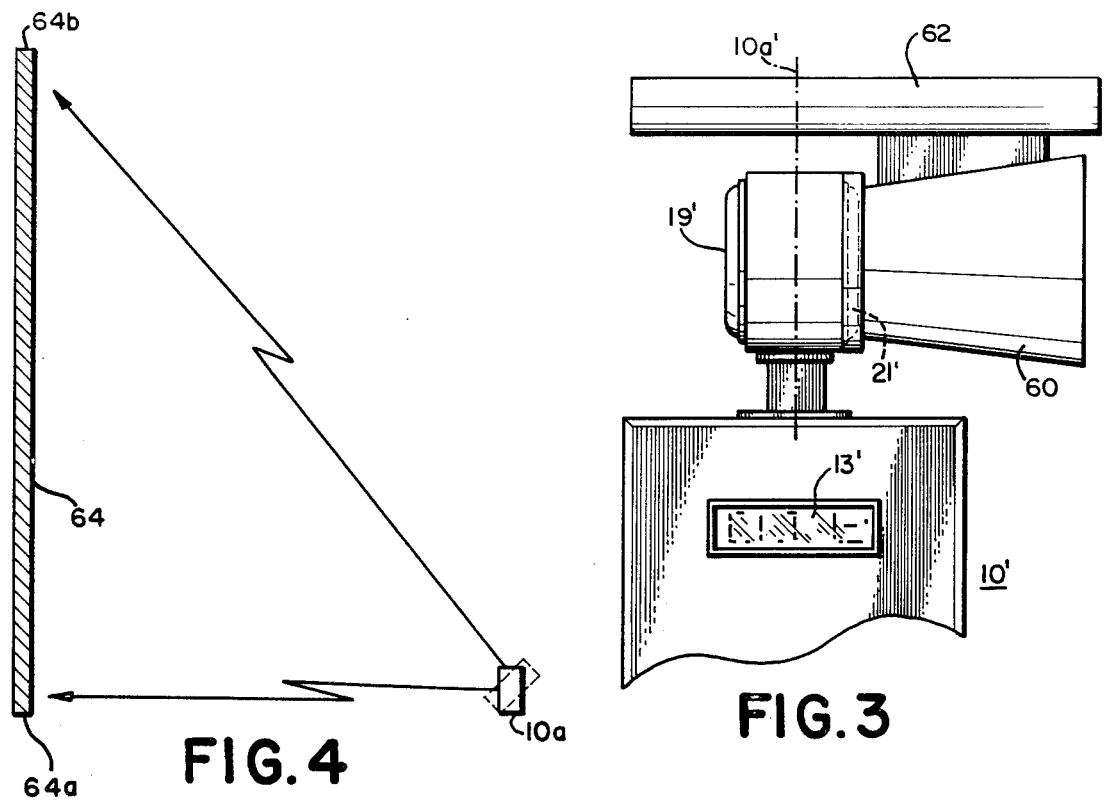
FIG. 4
FIG. 3

ABSTRACT# DISTANCE MEASURING SYSTEM USING ULTRASONIC RANGING

BACKGROUND OF THE INVENTION

This invention relates to an ultrasonic ranging system and more particularly to a distance measuring system using ultrasonic ranging.

BACKGROUND ART

Ultrasonic ranging systems are known in the art and are shown for example in U.S. Pat. No. 3,522,764 and in the publication Ultrasonic Ranging System by Polaroid Corporation dated July, 1980 P1834A. Using such systems it has been known to measure the distance between objects, such as walls, as described in German Offenlegungsschrift No. 2755 556. This reference provides a pair of emitter-receivers on either side of a measuring instrument. A first signal is emitted by the first pair and upon receipt of the reflected signal, the emitter of the other pair is actuated. Upon receipt of the second reflected signal, the receiver of the second pair shuts off a counter. This system as well as other prior art systems left much to be desired in that the first reflected signal may be further reflected and erroneously counted by the second pair as the second reflected signal. In addition, prior systems since they were measuring two objects at the same time had uncertainty as to where the ultrasonic beam was reflected. A further disadvantage was that the prior art required complex circuits in order to add in an amount of time equivalent to the distance separating the first and second pairs of emitter-receivers.

SUMMARY OF THE INVENTION

A system for measuring the distance between objects which includes a first and a second ultrasonic transducer. The first transducer is energized to transmit a first ultrasonic pulse to one of the objects and thereupon a counter begins the start of an initial count. The initial count is stopped when the first ultrasonic pulse is received by the first transducer. After a delay interval, the second transducer transmits a second ultrasonic pulse to the other object and at that time the initial count is restarted. The delay interval begins at the start of the initial count and is substantially equal to the maximum range time of the first transducer. The restarted count is stopped when the second pulse is received by the second transducer and the resultant count is displayed as a number related to the total distance between objects.

BRIEF DESCRIPTION OF THE DRAWINGS

FIG. 1 is a plan view, partially broken away, of a measuring system embodying the present invention;

FIG. 3 is a further embodiment of the invention including a cone and an optical sight to provide for triangulation; and FIG. 4 is a pictorial representation of a measurement of an object by triangulation by the system of FIG. 3.

DETAILED DESCRIPTION OF THE INVENTION

Figure 2:
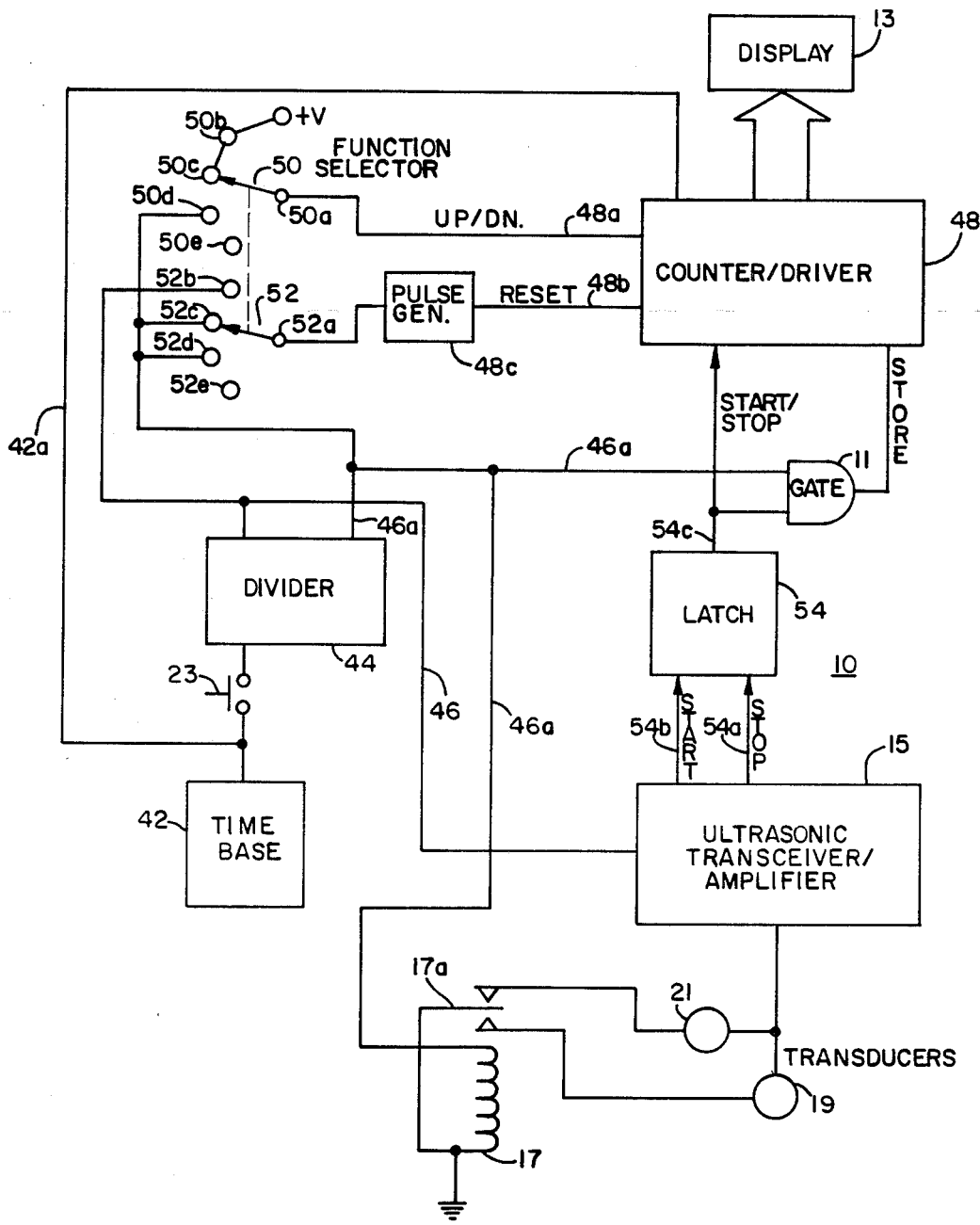
FIG. 2 is a block diagram showing the circuitry of the measuring system of FIG. 1.

Referring now to FIG. 1, there is shown a distance measuring system 10 having mounted on its upper surface a pair of ultrasonic transducers 19, 21 described in the above cited Polaroid publication. These transducers 19, 21 are mounted closer to each other than the sensors ability to resolve distance. Accordingly, it is not necessary to add any correction factor to account for the distance between the transducers, since they effectively operate as if they were on the center line 10a of instrument 10.

Transducers 19, 21 are carefully mounted so that they are concentric with each other along an axis 20 and face in opposite directions with transducer 19 facing to the left and transducer 21 to the right, as illustrated. In order to visually aim system 10, there is provided a light system 30 formed by a tube 32 within which are secured lenses 33, 34. A bulb 36 between the lenses provides a source of light aimed to the left and right through lenses 33 and 34 along axis 37 which is parallel to axis 20. As will later be described, bulb 36 is energized upon actuation of a measurement button 23 so that the operator can assure that transducers 19, 21 are focused on desired objects such as walls 39, 41 rather than undesired objects. For example, if it is desired to measure the distance between walls 39 and 41, the operator will ascertain that the light beam strikes the walls. Thus, transducers 19, 21 will "see" the walls rather than objects such as plants, lamps or other objects that might be in front of the wall and cause errors.

Referring now to FIG. 2, there is shown a block diagram of system 10 in which transducers 19, 21 are operated by an ultrasonic transceiver/amplifier 15 which is described in the above cited Polaroid publication. A time base signal is provided by a crystal oscillator 42 which provides a 5630 HZ signal by way of switch 23 to a divider circuit 44. Circuit 44 divides the input signal and produces by way of a line 46 a 5.5 HZ signal to transceiver/amplifier 15. In addition, the output of oscillator 42 is applied by way of a line 42a to a counter/driver 48 which operates an LCD display 13, also shown in FIG. 1. In addition, output line 46a of divider 44 provides a 2.75 HZ signal (1) to switches 50 and 52 and (2) to the coil of a relay 17 and (3) to a gate 11. Gate 11 has its second input connected to line 54c from a latch 54 and its output coupled as a stored signal to driver 48. Latch 54 provides on line 54c the start/stop output to driver 48 and has as inputs the stop count 54a and start count 54b from transceiver/amplifier 15.

As illustrated, switches 50, 52 are in the add mode in which the output of transceivers 19, 21 are added together in order to provide a signal indicating the total distance between objects 39, 41. In this mode, a positive potential is applied to movable contact 50a which is the up/down input 48a for counter/driver 48 and the 2.75 HZ signal is also applied to movable contact 52a of switch 52. Contact 52a is coupled through a pulse generator 48c, which feeds memory reset input 48b for the driver. Upon actuation of switch 23, a 2.75 HZ signal is applied to relay 17 to thereby alternately apply the ultrasonic actuating signal from amplifier 15. At the same time, the 5.5 HZ or firing signal on line 46 is applied to amplifier 15. It is in this manner that a complete pair of readings are taken and applied through driver 48 to display 13, 4 times per second.

More particularly during a first half cycle of the signal on line 46a, relay arm 17a is actuated to the lower position and thus transducer 19 is energized to send out a first ultrasonic pulse. This sending of the emitted pulse is acknowledged by amplifier 15 and a start count signal is applied by way of line 54b to actuate latch 54 and provide an enable signal on line 54c thereby starting counter 48 to count. When the first pulse is received by transducer 19, amplifier 15 acknowledges this by providing a signal on line 54a to disable latch 54 thereby to stop counter 48. It will be understood that during the time return pulse is detected by transducer 19, arm 17a is still in the down position as a result of the 2.75 HZ signal. This signal is selected so that arm 17a stays down for the total time duration of the emitted signal at its maximum sensor range. It is in this manner that the emitted signal has an opportunity to entirely dissipate and there is no chance that this first signal would be read as a second signal by transducer 21. Thus, the signal on line 46a is selected to provide a delay interval substantially equal to the maximum range of the transducers and virtually eliminates the problem of cross coupling between transducers 19, 21.

At this time counter 48 maintains the count provided by transducer 19 and waits for a further signal. At the termination of the half cycle on line 46a, arm 17a is actuated to its up position at the same time as a firing pulse is produced on line 46 to fire transducer 21 and start counter 48 in the manner previously described. Counter 48 counts up from the previous count until a return pulse is received by transducer 21 and the total count is latched in counter 48 and updated to display 13. Immediately after the display is latched, counter 48 is immediately reset to zero in preparation for the next count. The reset is provided by the 2.75 HZ signal on memory reset line 48b and gate 11 is effective to latch the value from the counter to the display 13. In the manner previously described arm 17a remains in its up position for the half cycle on line 46a to allow the ultrasonic pulse to dissipate sufficiently before the process is repeated for the next dual counting.

There has now been described the manner in which the total distance between objects 39, 41 may be determined. System 10 may be used to measure the center line between objects 39, 41 by turning switches 50, 52 to position "3" identified as "Center" as illustrated. In this position the up/down signal 48a to counter 48 is now connected to the 2.75 HZ line 46a. A positive signal is applied to line 48a during the first half cycle and a negative signal during the second half cycle. Accordingly, during the first half cycle when arm 17a is in its lower position transducer 19 is effective to provide a normal up count through latch 54 to counter 48a. However, during the second half cycle transducer 21 instead of counting up again from the first half count is effective to count down from the first half count. It is in this manner that the second half count is subtracted from the first half count and if the two half counts are identical a zero will be displayed on display 13 indicating that transducers 19, 21 are exactly between objects 39, 41. It will be understood that anything other than a zero count will indicate that system 10 is off center by the value displayed.

It will be understood that in the uppermost position "1" of switches 50, 52 the memory reset is constantly being reset by the 5.5 HZ signal and thus each half cycle count begins with zero. In this position, only transducer 19 is effective to be displayed. The store signal into counter 48 only updates every complete cycle. In this mode only transducer 19 is used. Accordingly, system 10 may be modified in the form shown in the further embodiment of FIG. 3. In FIG. 3, structure 10' provides a triangulation reading as shown in FIG. 4. Specifically, in measuring an object 50 which may be a building, for example, a first reading is taken from system 10' to the base 50a of the object. A second reading is taken from system 10' to the top 50b of building 50. With these two readings, the height of building 50 i.e., the distance between 50a and 50b, may be determined in the manner set forth in the program listing later to be described.

In system 10', as a result of the necessary distances involved in readings 1 and 2 a cone 52 is provided in order to focus the ultrasonic pulse from transducer 19' and to provide greater range as described in the above cited Polaroid publication. In order to properly direct cone 52 an optical sight 54 is provided of hollow construction so that system 10a may be accurately sighted onto the base 50a and the top of building 50b. To provide for the triangulation calculation the program listing later to be described is performed by system 10' by using a microprocessor such as an Intel Z80 for the counter section and an Intersil ICM 7211M as the driver section in place of counter/driver 48 in system 10. The microprocessor drives a display interface which in turn drives display 13. The operation of system 10' is as previously described for transducer 19 only.

The program to follow has been written in Basic and may be compiled for use in the microprocessor. In the program listing, in line 1000 the subroutine provides for the sending of the ultrasonic pulse and waiting for a return pulse. In line 100 an X has been assigned to the value of that emitted pulse. Line 110 indicates that upon completion of that reading a beep is produced. For the second reading an H is assigned for the reading taken in subroutine 1000, the second reading. Another beep is produced on the completion of the second reading in line 130. The calculation to measure the triangulation is provided in line 140. The final value is then outputted to the display in line 150.

| Program for Height Measurement of Tall Object | |
|---|---|
| 100 | GOSUB 1000 : X = A |
| 110 | OUT (4,1) : REM TURN ON BEEP |
| 120 | GOSUB 1000 : H = A |
| 130 | OUT (4,1) : REM TURN ON BEEP |
| 140 | Y = SQR (H 2 − X 2) |
| 150 | OUT (2,Y) : REM UPDATE DISPLAY |
| 160 | GOTO 100 |
| 1000 | OUT (3,1) : REM ACTUATE PULSE |
| 1010 | T = IN(5) : REM CHECK FOR RETURN PULSE |
| 1020 | IF T <> 1 THEN 1000 |
| 1030 | A = W(1) |
| 1040 | RETURN |

Input/Output Port Assignments:
1 - Input count in feet of ultrasonic reading
2 - Output result to display
3 - Actuate ultrasonic pulse
4 - Start audible beep
5 - Indication return pulse

I claim:
1. A system for measuring the distance between a first and a second object comprising:
a first and second ultrasonic transducer;
switching means including counter means for energizing the first transducer to transmit a first ultrasonic pulse to said first object and thereupon actuating the counter means to begin the start of an initial count, means for stopping the initial count by said counter means when the first ultrsonic pulse is received by said first transducer;
said switching means including timing means for energizing the second transducer to transmit a second ultrasonic pulse to said second object only after a delay interval which begins at the start of the initial count and is substantially equal to the maximum range of the first transducer thereby causing the first ultrsonic pulse to be entirely dissipated before transmitting the second pulse;

restarting the initial count by the counter means upon transmittal of the second ultrasonic pulse; and means for stopping the restarted count when the second ultrasonic pulse is received by the second trnsducer and means for displaying the resultant count as a number related to the total distance between the first and second objects.

2. The measuring system of claim 1 in which said timing means includes relay means which is actuated for said delay interval to permit counting by the counter means during the delay interval and to transmit the second ultrasonic pulse only after the delay interval.

3. The measuring system of claim 1 in which the first and second ultrasonic transducers face in opposite directions and are disposed concentric with each other along the same transducer axis.

4. The measuring system of claim 3 in which there is provided means for visually aiming the measuring system including light source means for aiming beams of light parallel to the transducer axis and in the directions faced by the first and second transducers whereby the operator can assure the first and second transducers are focused on desired objects.

5. The measuring system of claim 3 in which the first and second ultrasonic transducers are mounted closely back to back thereby to avoid any correction factor for the distance between the transducers.

6. The measuring system of claim 3 in which there is further provided means for subtracting the value of the restarted count from the initial count and for displaying the resultant count as a number related to the distance from the center between the first and second objects.

7. The measuring system of claim 3 in which there is further provided means for counting down from the initial count by the counter means upon transmittal of the second ultrasonic pulse and said stopping means includes means for stopping the counting down when the second ultrasonic pulse is received by the second transducer whereby said displaying means provides a display of a number related to the distance that the system is off center between the first and second objects.

8. The measuring system of claim 1 in which there is further provided means for disabling the second transducer and providing only for an initial count, means for storing a first initial count as a number related to the distance between the measuring system and the base of a tall object and a second initial count which is a number related to the distance from the measuring system to the top of a tall object and means for calculating the triangulation of the first and second initial counts to provide a display of a number related to the height of the tall object.

9. The measuring system of claim 8 in which there is provided a cone for focusing the ultrasonic pulses of the first ultrasonic transducer and there is further provided an optical sight for accurately sighting the first ultrasonic transducer.

* * * * *